Figure 7:
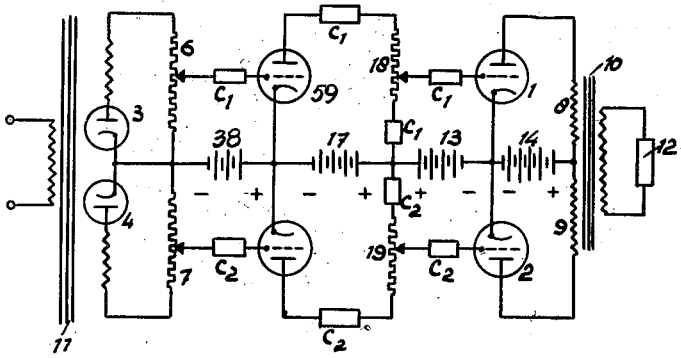

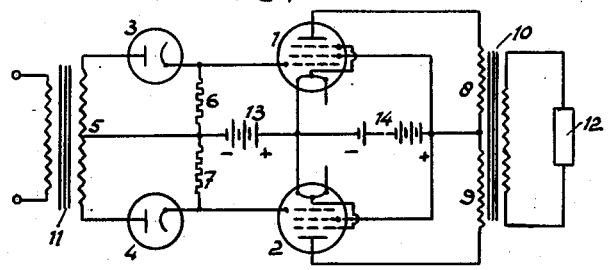
FIG: 1
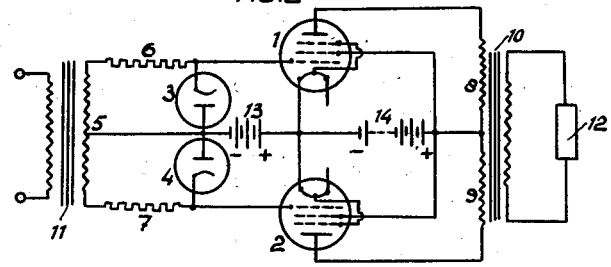
FIG: 2
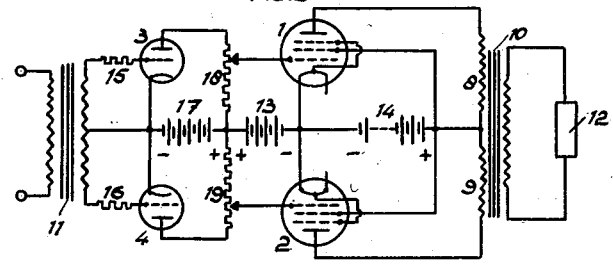
FIG: 3
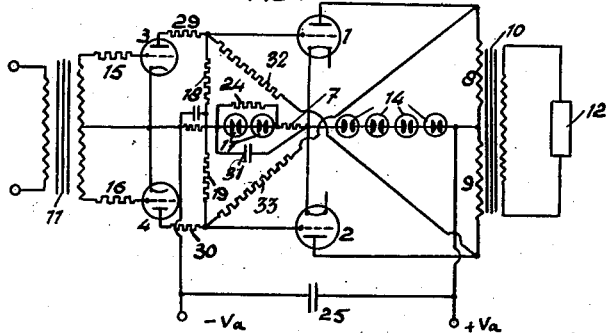
FIG: 10
Inventor:
Johannes Jacques Numans,
By ... Attys.

Dec. 25, 1934.   J. J. NUMANS   1,985,352
CIRCUIT ARRANGEMENT FOR ELECTRICAL AMPLIFIERS
Filed Aug. 1, 1930   5 Sheets-Sheet 2
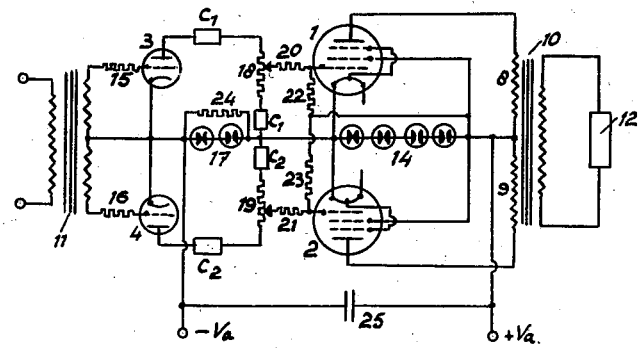
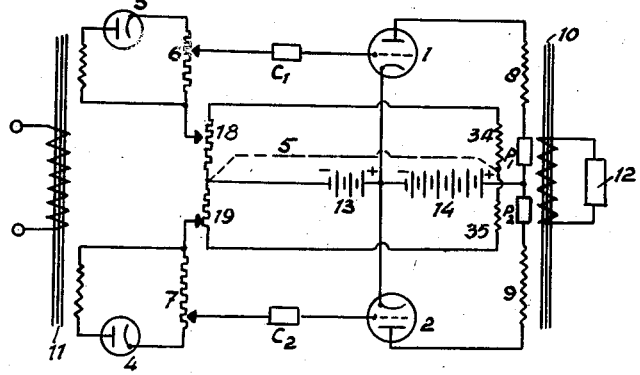
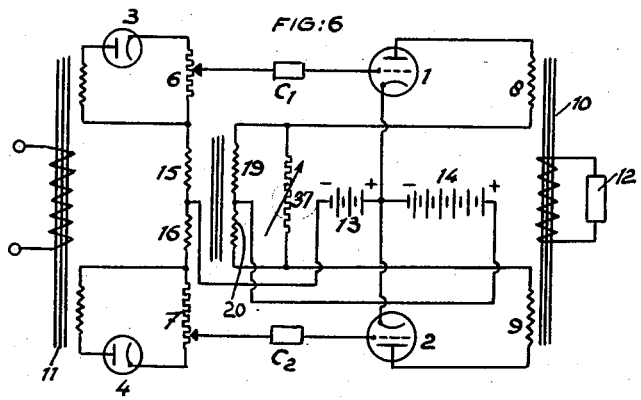
Inventor:
Johannes Jacques Numans, Dec. 25, 1934.  J. J. NUMANS  1,985,352
CIRCUIT ARRANGEMENT FOR ELECTRICAL AMPLIFIERS
Filed Aug. 1, 1930  5 Sheets-Sheet 3

Inventor:
Johannes Jacques Numans,

Dec. 25, 1934.  J. J. NUMANS  1,985,352
CIRCUIT ARRANGEMENT FOR ELECTRICAL AMPLIFIERS
Filed Aug. 1, 1930  5 Sheets-Sheet 4
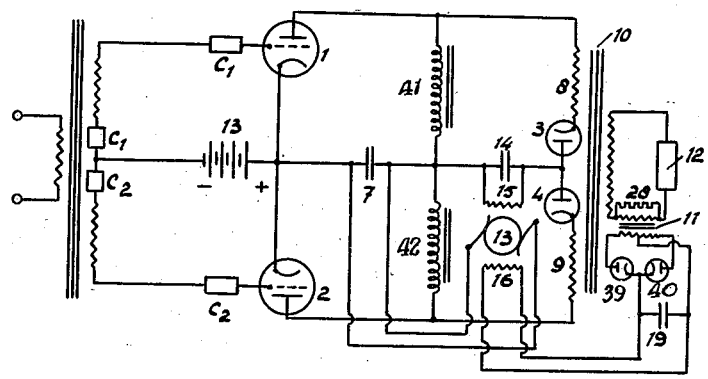
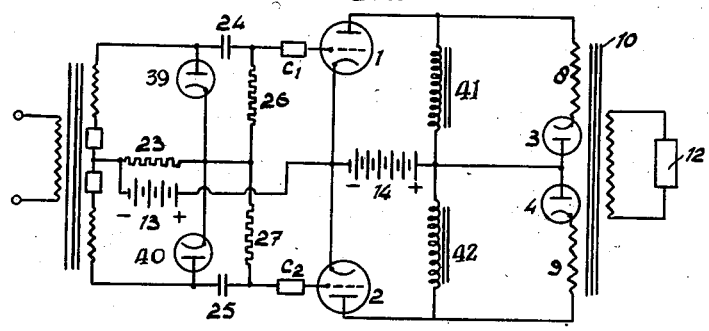
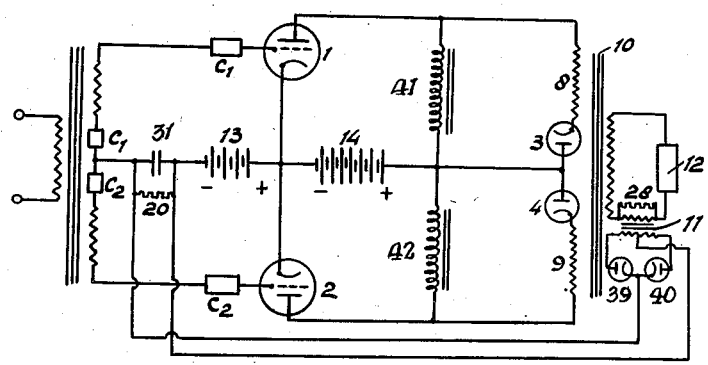
Inventor:
Johannes Jacques Numans,
By Spear, Middleton, Donaldson & Spear
Attys.

Dec. 25, 1934.   J. J. NUMANS   1,985,352
CIRCUIT ARRANGEMENT FOR ELECTRICAL AMPLIFIERS
Filed Aug. 1, 1930   5 Sheets-Sheet 5
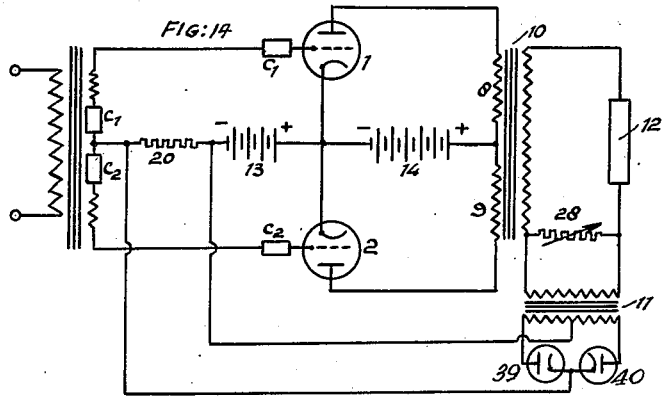
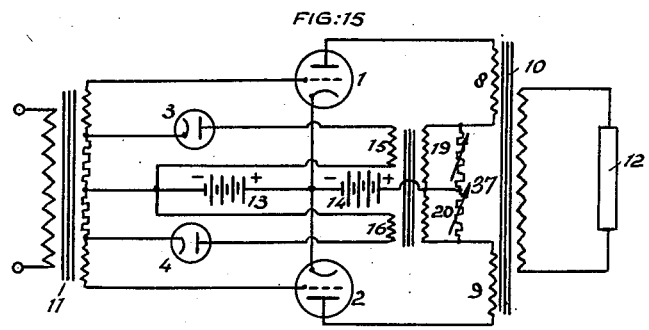
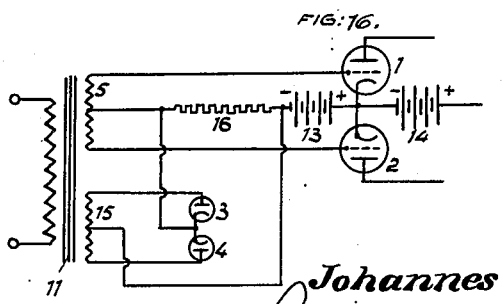
Inventor:
Johannes Jacques Numans,
By Spear, Middleton, Donaldson Hall
Attys.

Patented Dec. 25, 1934

1,985,352

UNITED STATES PATENT OFFICE 1,985,352

CIRCUIT ARRANGEMENT FOR ELECTRICAL AMPLIFIERS

Johannes Jacques Numans, The Hague, Netherlands

Application August 1, 1930, Serial No. 472,339
In the Netherlands February 25, 1930

7 Claims. (Cl. 179—171)

This invention relates to circuits arrangements for electric amplifiers and particularly to circuits employing electron discharge tubes, thermionic valves or similar devices arranged in balanced or "push-pull" relationship, as well as to their operation. The invention has special reference to low frequency amplifiers used for instance in modulating circuits for oscillation generators of wireless transmitting systems, or for operating loud speaking telephone receivers or similar devices. The invention may also be applied generally to amplifying arrangements.

The object of the present invention is to increase the power output of such amplifiers, thereby still enabling operation at the linear parts of the characteristics of the amplifier tubes, thus avoiding so-called non-linear distortion which may arise from operation on curved parts of the characteristics, more especially the lower curved parts and the point where the anode current vanishes. Hence, for telephonic or low frequency amplifiers the invention is especially useful.

It is well known in the art that it is possible to increase the power output of amplifiers for telephonic purposes by connecting two tubes in balanced (push-pull) relationship and by operating them in such a way that the no-load or steady anode current is practically zero when the grids are not excited by signal waves. In this way the steady load on the tubes is materially reduced; therefore a higher anode voltage may be applied and consequently more output may be obtained (see for instance U. S. A. Patent 1,699,110 A. V. Loughren).

It has been found in practice, however, that considerable distortion results when amplifiers are operated in this way, even when in the absence of excitation a small anode current is permitted. For even in this case operation occurs on curved parts of the characteristics. The proof that operation really takes place on curved parts is, that in such systems the mean anode current rises under the influence of the excitation, this rise being an indication of non-linear operation of the amplifier tube, as is well-known. This rise of mean anode current is very essential in such systems, for, did the anode current not rise, the anode input energy would be zero or very nearly zero, under full load conditions (that is when applying excitation to the control electrodes), and consequently no output or only little output could be obtained.

Hence, in the known systems the useful feature of the mean anode current, rising under the influence of the excitation (signal) is connected with the unwanted feature that operation takes place on curved parts of the characteristics.

The present invention provides a solution for this difficulty, and hence a very considerable improvement may be obtained.

An essential feature of the present invention is that it enables the tubes to be operated exclusively on the substantially straight portions of the characteristic curves, thereby avoiding non-linear distortion, and that nevertheless the anode input energy does increase under the influence of the excitation, thereby enabling a large output to be obtained.

The increase of anode input energy is the greater as the excitation is stronger (that is as the control (signal) voltage is higher) and, consequently, more anode input energy is required to enable more output energy to be delivered, so that the maximum output under full-load conditions (strong signal) may be very large indeed.

As the anode input energy can be kept very small under no-load conditions, the general efficiency of the system according to the invention is very high.

Now I will proceed to describe my invention more in detail.

The drawings in Figs. 1 to 16 show different embodiments of the invention as applied to electric amplifiers.

According to the present invention in a system comprising tubes connected in balanced relationship, the increase of the anode input energy under the influence of the excitation is obtained by varying the average grid voltage or the average anode voltage, or both, under the influence of the excitation.

Of course, if discharge devices with more than three electrodes are used, an alteration of the average voltage of one of the auxiliary electrodes is equally effective. It is also possible to apply the invention to discharge devices with magnetic control or combined magnetic and electric control, with electronic or with ionic currents or with both, and generally the invention may be applied to any kind of discharge device or similar apparatus with one or more control electrodes and one or more output electrodes, contained in a vacuous, or nearly vacuous or gas-filled envelope.

It is only necessary that the characteristic relation between the output currents or voltages, and the control voltages or/and currents, or both, do not show irregularities in the region of that portion of the characteristic curve at which each valve is operated, while in order to avoid amplitude distortion the smallest possible deviation from linearity is desirable. The amount of deviation which may be tolerated depends on the permissible non-linear distortion.

In order that the invention may be simply explained, it will be described as applied only to tubes having a heated cathode and electrical control in a high vacuum, as now commonly used, and of which the characteristic curves may be assumed to be well-known.

According to the present invention the necessary variation of the average voltage of one or more of the electrodes of the tubes arranged in push-pull relationship, caused by the control voltage, is obtained by introducing asymmetrical conducting devices in the grid circuits or in preceding circuits (for instance of a preceding amplifier) in the anode circuits or following circuits (for instance after an output transformer) or in both. Further, according to the invention, grid current rectification by means of a resistance in series with the grid may be employed, the asymmetrical conductivity of the grid cathode path itself serving the purpose of the present invention. Another possibility is to use anode rectification, for instance in a preceding amplifier by adjusting for operation on a curved part of the characteristic curve.

Thus, the use of rectifiers is an essential feature of the invention.

The asymmetrical conducting devices employed in the carrying out of the present invention, and which for the sake of brevity will be referred to as rectifiers may comprise two electrode devices with heated cathodes, neon-lamps and similar devices, metal-vapour rectifiers with dependent or independent discharge, crystal detectors, copper-oxide or similar dry rectifiers and generally any device the conductivity of which is considerably greater in one direction than in the other.

A device which does not conduct at all in one direction and has no resistance in the other would be ideal for the purposes of the present invention. This is never attainable in practice, and the internal resistance of most devices available is not even constant but depends on the amplitude of the applied current.

The resulting distortion can be reduced to any small value by making the output resistance or impedance in circuit with the rectifier, large in comparison with the internal resistance or the variations in the internal resistance.

In order to avoid distortion as caused, for instance, by a threshold point in the characteristic curve, it may be desirable to apply a bias voltage. Generally such an auxiliary voltage may be desirable in order to adjust the operating position on the characteristic curve of the rectifier.

When the rectifiers are disposed in the grid circuits of the amplifier tubes, it is necessary according to the invention for the direct current components produced by the rectification to be actually transmitted to the grids of the amplifier tubes in question.

When the rectification takes place in a preceding amplifier stage or other circuit, it is, of course, of equal importance that not only the oscillating components but also the direct current components are transmitted to the grids or other control electrodes of the amplifier tubes. In accordance with the invention, therefore, the connection with the grids of the amplifier tubes must be a conductive connection, and not inductive, as, for instance with a transformer, nor capacitive, as, for instance, with a grid condenser, because unless a conductive connection is employed, alteration of the average grid voltage of the amplifier tubes in question would not be produced.

In the application of the invention a considerable increase of the output energy can be obtained by operating the tubes of the push-pull arrangement intermittently, which, as hereinafter explained, can also be accomplished by using rectification, either with the same rectifiers altering the average voltage or with other rectifiers.

The rectifiers used in accordance with the present invention, to bring about an intermittent operation, exercise a commutating action, so that it is possible to operate the push-pull amplifier tubes on the straight portions of their characteristic curves.

By applying rectification, an asymmetric operation is obtained according to the invention enabling distortion due to non-linear portions of the characteristic curves of the tubes to be prevented. Hence the rectifiers serve for the purpose of preventing distortion.

This may be explained by reference to the drawings Figures 1 to 16 of which show different embodiments of the invention as applied to electric amplifiers.

In Figure 1, for instance, the rectifiers prevent the signal voltage from reaching the lowest curved parts of the tube characteristics. Said rectifiers prevent the excitation voltage to make the grids more negative; they only allow it to make the grids more positive, that is, less negative.

The halves of the cycles occurring in each of the tubes are not alike apart from the fact that they are opposite in phase.

Now such intermittent (asymmetric) operation tends to give rise to considerable energy losses in the tubes due to the fact that an exchange of energy takes place between the tubes, one tube loading the other alternately. As a consequence the general efficiency is reduced.

This important point may be made more clear by referring to the drawings, for instance Fig. 1.

When the tube 1 is operative and in consequence is carrying more anode current than normally, its anode voltage is decreased. The other tube is in opposite phase and therefore is inactive. As a result of the inductive coupling between both halves of the primary winding of the output transformer, the anode voltage of the lower tube has increased, in consequence of which an increase in anode current will occur in this tube, this increase in anode current constituting an undesirable load on the first tube. During the other half-cycle of the input voltage the reverse happens, the upper tube loading the lower one.

Assuming, for the sake of simplicity, that the excitation is a pure sine wave, the anode currents in each of the push-pull tubes will be non-sinusoidal due to the intermittent (asymmetric) operation. In view of the phase relations in the push-pull tubes only the sine components of these currents will be influenced by the load impedance, that is, will give rise to useful output energy and to counteracting voltage, limiting said components.

The exchange of energy referred to above is brought about by the fact that for the other, non-sinusoidal, components of the anode currents both halves of the push-pull arrangement are mutually short-circuited so that these components attain great values and give rise to considerable energy losses. Moreover, they do not lead to useful output energy.

Thus, it is clear that the fundamental sine wave will be reduced in value as compared with the other components. This reduction will be greater, as the external load impedance is higher in comparison with the internal resistance of the tubes.

As a consequence this serious loss of energy may be reduced by making the load impedance small in comparison with the internal resistance of each of the tubes, taking into consideration the ratio of the output transformer.

When using tubes having three electrodes, this would, however, also reduce the output and hence the efficiency, and therefore would not result in an improvement of any importance.

However, it is possible considerably to increase the effect of the invention by reducing said energy losses by applying the reverse method which produces the same effect, but which makes it possible to avoid the above drawback.

In carrying out the invention, the internal resistance of each of the tubes, or the effect of it, is made very large in comparison with the load impedance, or the effect of it. There is another method of obtaining the desired effect, which it is convenient to explain at the end of this specification, and in accordance with which the internal resistance as defined above is on the contrary made very small.

There are several methods of making the internal resistance of the tubes large. One of them is in the application of so-called pentode tubes, which have a very high internal resistance, for example ten to twenty times as large as that of a corresponding triode, and with which it is still possible to obtain a considerable anode current with a low anode voltage, even without making the grid positive. This is, among other methods, accomplished by the application of a space-charge electrode or screening grid.

In an amplifier according to the invention, however, the effect of a high internal resistance can also be obtained with triodes. In order to obtain this effect an additional compensating excitation is applied to the control elements of the tubes, this additional excitation may be derived from the voltage or current in the output circuits and should be of suitable amplitude and phase.

A simple calculation shows, that the internal resistance, (or the effect of the internal resistance) of a triode-system, in the present case each of the halves of the push-pull arrangement, is infinitely large with respect to an externally applied anode voltage, when at the same time a compensating control voltage is applied to the grid, which is opposite in phase and the amplitude of which is $1/\mu$ of that of the anode voltage, $\mu$ being the amplification factor of the tube.

When the compensating voltage is derived from the anode circuit, as assumed above, a complete compensation may be attained in this way. When the compensating voltage is derived from the anode current, then complete compensation is a condition of limit which can be sufficiently approximated for practical purposes by increasing the compensating voltage. With both methods of compensation very good results may be obtained in practice.

When compensation is applied, the interaction of the intermittently working tubes is restricted to the generation of anode and grid voltages, the amplitude and phase of which are so related to each other that no energy exchange, and consequently no loss of any importance, occurs.

When, for instance, in Fig. 1 the anode voltage of the lower tube tends to increase in consequence of the coupling between both the halves of the output transformer winding, a compensating voltage is generated and applied to the grid which prevents an actual increase of the anode current.

It is reasonable, therefore, that the compensation can also be applied to discharge tubes with magnetic or combined magnetic and electric control, using one or more control electrodes and one or more output electrodes. It is immaterial from which of the output electrodes the compensating voltages are derived, and to which control electrodes they are applied.

It is possible to have many modifications of the coupling means between output and input circuits of the push-pull tubes.

The compensating voltage may be directly applied to the grid circuits of the tubes, or indirectly, for instance by applying it to the anode or grid circuits, or associated circuits, of a preceding amplifier. Several modifications will be explained when the invention is described with reference to the accompanying drawings.

The reduction of energy exchange between the tubes by means of pentode tubes or the like, or by means of compensation, serves for the purpose of limiting the losses (resulting from asymmetric operation of the push-pull arrangement). The result is that the efficiency and hence the optimum output energy is increased.

The asymmetric (intermittent) operation results in an important economical advantage, in case the mutual energy exchange between the tubes is reduced at the same time.

It is in no way essential to derive the compensating voltages from the output circuits. It is also possible to derive them from the control voltage itself by subjecting the control voltage to an imperfect rectification process, so that it also influences the push-pull tubes during the inoperative half waves to a certain extent.

This feature may be illustrated as follows:

When, for instance, the amplifier is loaded with a constant ohmic resistance, then in order to eliminate losses due to intermittent energy exchange between the tubes it is only necessary to effect a decrease in grid voltage during each "inoperative" half cycle, which is opposite in phase and $1/\mu$ in amplitude, of the increase in anode voltage caused by the other tube. This is possible, for instance, by shunting the rectifiers of Fig. 1 with resistance of suitable value. Also when instead of pentodes, triodes with relatively low internal resistance are used in this circuit, no change in the anode current will occur in the inoperative half-cycles, so that the energy losses due to interaction between the tubes are eliminated.

When the external load is an impedance, the phase and value of which alter with frequency, it is desirable that the compensating control voltage should alter in a similar way. This may be accomplished by using as shunts, or instead of the resistances 6 and 7 in Fig. 1, suitable impedances, the properties of which are determined by the characteristics of the external load impedance. An imperfect rectification can also be obtained in Fig. 2 for instance, by introducing impedances in series with the rectifiers 3 and 4.

When grid-rectification is used, as shown for instance in Fig. 3, a compensating effect can also be obtained, by introducing a resistance or an impedance between the grid and the filament of each of the tubes, or by making the resistances or impedances 15, 16 relatively small.

Circumstances will, of course, decide the type of compensation to be employed viz. that derived from the output current or voltage, or that derived from the control voltage itself.

In order that the invention may be more clearly understood and readily carried into effect, some applied examples will now be described with reference to the accompanying diagrams, in which the features referred to above may be recognized.

Fig. 1 shows a push-pull arrangement with two five-electrode tubes 1 and 2 coupled with a load impedance 12 through an output transformer 10 with primary windings 8 and 9.

In order to effect an increase in the input energy under the influence of the control voltage and an asymmetric operation, according to the invention, rectifiers 3 and 4 are inserted in the grid circuits of the tubes 1 and 2, said rectifiers being each connected to one of the secondary windings of the input transformer 11. One half-cycle of the applied control voltage will make rectifier 3 conducting and raise the grid voltage of tube 1, and the other half-cycle of the control voltage will produce the same effect with the rectifier 4 and the grid of tube 2.

With the aid of grid battery 13 both push-pull tubes are adjusted to operate, for instance, at the lower end of the straight portion of their characteristic curves.

Since, due to the applied control voltage only increases of the grid voltage, and consequently of the anode current are possible, the average values of grid voltage and anode current, and hence of the anode input power supplied to the amplifier increase as well.

Resistances 6 and 7 are large in comparison with the internal resistance (or the variations of the internal resistance) in the conducting sense of the rectifiers 3 and 4, and small in comparison with the internal resistance in the sense in which the rectifiers would not pass any current if they were ideal.

Furthermore, the grid battery is connected through these resistances to the grids of the tubes 1 and 2.

The action of the rectifiers 3 and 4 results in the operation of the tubes on the straight portions of their characteristic curves, this operation being substantially asymmetric and intermittent as shown before.

The interaction losses are practically eliminated by using for the tubes 1 and 2 pentodes having a high internal resistance, and by properly chosen dimensions of the load impedance 12 or the ratio of the output transformer 10. Then the value of the load impedance no longer influences the current supplied to it.

A completely similar rectifying action may be obtained by means of the circuit arrangement shown in Fig. 16. When the amplitudes of the rectified and unrectified voltage are equal, each being half the grid voltage used in Fig. 1, the total voltage applied to the grids of tubes 1 and 2 in Fig. 16 will be the same as that of Fig. 1.

If, however, the unrectified voltage predominates in Fig. 16, the same operation is obtained as when incomplete rectification is applied to Fig. 1 (f. i. by shunting the rectifiers 3 and 4 with resistances).

The rectification process used in Fig. 16 may, of course, also be applied to similar circuit arrangements hereinafter to be described, although in general the method of Fig. 1 is to be preferred on account of its simplicity.

A rectifying action may also be obtained as shown in Fig. 2 by arranging the rectifiers in parallel to the grid-cathode space of the tubes 1 and 2, and by introducing large resistances or impedances 6 and 7 in series with the rectifiers. During one half cycle of the control voltage, when, for instance, the grid voltage of tube 1 is raised, rectifier 3 is non-conductive, while rectifier 4 is passing current. A decrease of the grid voltage of tube 2 is consequently impossible due to the low internal resistance of rectifier 4 which is so small in comparison with resistance 7 that the grid-cathode space of tube 2 is practically short-circuited.

Fig. 3 shows a circuit arrangement, including pentode-tubes. In this case the rectification is brought about in the grid circuits of a preceding amplifier stage, instead of directly in the grid circuits of the final tubes. Rectifiers 3 and 4 are triodes, the grids of which are connected through high resistances, or impedances, 15, 16, to the terminals of the secondary windings of the input transformer 11. No negative bias is applied to these grids and consequently grid-current rectification of the applied input voltage will occur due to the presence of the resistances 15, 16, the operation being similar to that brought about by the diodes 3 and 4, together with the resistances 6 and 7 of Fig. 2.

In this case, a decrease in grid voltage and hence an increase in anode voltage occurs in the tubes 3 and 4, and these variations are wholly or partly conducted directly to the grids of the final push-pull tubes 1 and 2. The grids are in this way energized with positive pulsations, so that the average voltage increases, thereby raising the average anode current and input energy.

The voltage drop across the resistances 18 and 19 serves to provide the negative grid bias for the grids of the tubes 1 and 2, thus effecting the desired adjustment of the operating point on the lower end of the straight portion of the characteristic curve. When the grid-voltage so obtained is too large a grid-battery 13 may be interposed, as in Fig. 1. In this case the negative terminal is connected to the cathodes of the final push-pull tubes.

A further object of the battery 13 is to prevent distortion in the preceding amplifier stage including the tubes 3 and 4. Without this battery, it would not be possible to raise the grid voltage of the final tubes 1 and 2 up to zero without reducing the anode current of the tubes 3 and 4 to zero. Then the latter tubes would operate also on the lower curved portions of their characteristic curves and this might lead to non-linear distortion.

Fig. 4 shows a modification, agreeing in general principles with Fig. 3, but adapted for the supply of all operating voltages from a common source for instance an eliminator-unit $Va+$, $Va-$ containing a rectifier, if used on alternating-current mains, and a smoothing filter of which 25 is one of the smoothing condensers.

This eliminator unit feeds the series-connected neon lamps 14 and 17, the voltage drop across which is practically independent of the current. The object of these lamps is to stabilize the voltage taken off from them. They may be substituted by other devices with a flat voltage-current characteristic.

The anode supply for the preceding amplifier tubes 3 and 4 (which serve also as rectifiers) is obtained from the lamps 17 which take the place of the battery 17 in Fig. 3. These lamps are shunted by a resistance in order to reduce the current through them. Furthermore, it may be desirable to introduce a by-pass condenser for passing currents of rather high telephonic frequency, this being necessary owing to the inertia of the ions in neon-tubes which cannot follow rapid alternations. The anode supply for the final amplifier tubes is tapped off from the lamps 14, which might also be shunted by a condenser.

The voltage drop across the resistances 20, 21 serves as a substitute for the battery 13 of Fig. 3, and makes the potential of the grids of the final tubes 1 and 2 less negative than the potential at the tapping points on the potentiometers 18 and 19. The latter form a direct conducting connection between the final tubes and the preceding tubes.

The tubes 1 and 2 may be triodes if compensating voltages are introduced at $C_1$ and $C_2$, which are derived from the output circuits of tubes 1 and 2, as illustrated in the drawings. The values of the actual compensating grid voltages may be adjusted by the potentiometers 18 and 19.

Fig. 5 shows a method of applying compensation which is a modification of Fig. 1, the amplifier tubes 1 and 2 being shown as triodes. Fig. 2 may also be modified for use with triodes, the method of obtaining compensation being clear without requiring further comment.

In order to obtain the desired compensating voltages, the output transformer 10 is provided with two tertiary windings 34 and 35, which are connected together and, for the sake of symmetry, may also be connected to the junction of the potentiometers 18 and 19 by a connection 36. The voltages induced in the windings 34 and 35 bear a fixed relation to the anode voltages across the windings 8 and 9. The windings are wound in such a manner that they are in exact phase opposition. By means of the potentiometers 18 and 19, the compensating voltages applied to the grids may be accurately adjusted. The method of operation of the rectifiers 3 and 4 needs no further comment. The value of the rectified control voltages actuating the grids may be adjusted with the aid of potentiometers 6 and 7. The rectified control voltages and the compensating voltages are thus applied in series, and therefore have an additive effect. It is clear that the compensating voltages may also be introduced at $C_1$ and $C_2$.

Adjustment of the compensating voltages is also possible by tapping from the potentiometers 18 and 19 the whole voltage induced in the windings 34 and 35, so that 18 and 19 might even be omitted, and by connecting the grids of the tubes 1 and 2 through variable resistances to the negative terminal of battery 13. When these resistances are decreased, the voltage drop in the resistances 6 and 7 is increased, and in this way it is possible to adjust the compensating voltage applied to the grids of the tubes 1 and 2.

It has already been stated that the compensating voltages may also be derived from the anode currents of the tubes 1 and 2. This might be accomplished by the use of two auxiliary transformers which may have a common core, the primary windings of which are inserted at $P_1$ and $P_2$ (Fig. 5) and the secondary windings of which take the place of the windings 15 and 16.

Fig. 6 shows a modification whereby a simplified circuit arrangement is obtained by omitting the potentiometers 18 and 19 of Fig. 5 and effecting the adjustment with the resistance 37 in Fig. 6 (with mid-tap). The voltages generated in the windings 15 and 16 are proportional to the voltage across the resistance 37, and this voltage is proportional to the anode current. In order to obtain this effect it is necessary for the self-inductance of 19 and 20 to be large in comparison with resistance 5.

It has now been clearly shown that the compensating voltages can be obtained in different ways, and can be applied at various points and therefore, for the sake of simplicity, no further examples will be described. The points at which the compensating voltages might be introduced are indicated in the diagrams by squares bearing the reference characters $C_1$ and $C_2$.

Fig. 7 shows a circuit arrangement analogous to Fig. 1, in which the rectification is effected by providing diodes 3 and 4 in the grid circuits of the preceding amplifier tubes 39 and 40. This circuit arrangement has the advantage, that both diodes might be combined in one vessel and connected to a common filament supply. The compensating-voltages may be introduced at one of the points $C_1$ and one of the points $C_2$.

Figure 8:
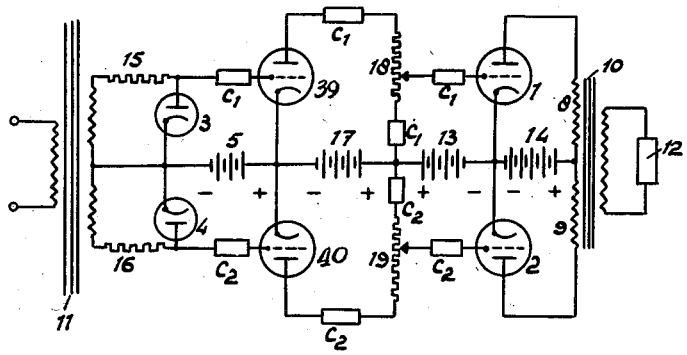

In Fig. 8 rectification also takes place in the grid circuits of the preceding amplifier tubes 39 and 40 analogous to Fig. 2.

Figure 9:
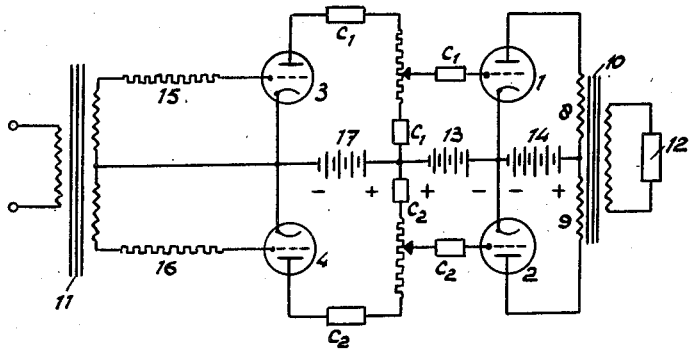

In Fig. 9 grid current rectification is employed analogous to Fig. 3. The grid-cathode space of the preceding amplifiers 3 and 4 operating without negative grid bias is here substituted for the rectifiers 3 and 4 of Fig. 8. The amplifying action of the tubes 39 and 40 of Fig. 8 is obtained in Fig. 9 by means of the tubes 3 and 4. The application of grid current rectification apparently leads to an appreciable simplification in this case.

Fig. 10 shows a similar arrangement to Fig. 9, in which it is possible, however, to obtain the operating voltages from one source, for instance an eliminator-unit $Va+$, $Va-$ analogous to that of Fig. 4.

The compensating voltages are directly obtained from the anodes of tubes 1 and 2, by means of a potentiometer arrangement consisting of the resistances 23 and 33 at one side and the resistances 18 and 19 shunted by the internal resistances of the rectifying amplifier tubes 3 and 4 at the other side, if necessary in conjunction with series resistances 29, 30. This arrangement serves to supply the anode voltage to the tubes 3 and 4 at the same time. The voltage across the lamps 17 and the resistance 7 is in opposition to the voltage across the resistances 18 and 19 and should be sufficiently predominating to provide the negative grid bias required for the tubes 1 and 2. The coupling of the tubes 3 and 4 with the tubes 1 and 2 is accomplished principally by the resistances 32, 33 respectively and 18, 19 respectively which in this respect have the effect of being connected in parallel.

An adjustment of the negative grid bias required for the tubes 1 and 2 may also be obtained by omitting resistance 7 and using a resistance 24 provided with a by-pass condenser. By adjusting the resistance 24 the anode current of tubes 3 and 4 is altered and, as a consequence, also the voltages across the resistances 18 and 19.

In the preceding examples, the rectifiers are introduced in the grid circuits of the push-pull tubes. It has already been pointed out that the object is to avoid a reduction of anode-current under the influence of the control voltage while each tube is operating at the part of the characteristic curve above the lower curved portion. This is accomplished by preventing the negative half waves of the control voltage from acting upon the grids and thereby causing a reduction in the anode current. Only the positive half cycles are operative and produce intermittent increases in anode current.

As will be explained in the following, the above object can also be attained by generating under the influence of the exciting or control voltage, an average grid voltage, which reduces the initially applied negative grid bias (Figs. 12 and 13). This is possible in combination with rectification on the anode side as for example by rectifiers 3 and 4, in order that a substantial unidirectional current flows through the primary coils of the output-transformer, so that intermittent operation occurs in this case also. Instead of influencing the average grid voltage, the desired increase in the average anode current can also be obtained by increasing the average anode voltage under the influence of the excitation. In this case the rectifiers are preferably used only on the anode side of the tubes.

According to Fig. 11 an increase in the average anode voltage may for instance be obtained by deriving the anode voltage of the tubes 1 and 2 from a dynamo 13, the excitation of which is assisted by an additional exciting winding 15 through which the average anode current of the diodes 3 and 4 is passed.

Another method of increasing the excitation of the dynamo is to rectify a small part of the output energy of the amplifier by means of the rectifiers 39 and 40 and a smoothing condenser 19, and supplying this energy to an exciting winding 16. Both methods may be combined, of course, as shown in the drawings.

It has already been stated that it is possible to decrease the average negative grid voltage under the influence of the control voltage of the tubes, and this may be accomplished by rectifying part of the control voltage itself according to Fig. 12 or, on the analogy of Fig. 11, by rectifying part of the output energy of the amplifier, preferably by using a transformer 11 in series with the load impedance 12, for instance according to Fig. 13. An adjustment of the effect obtained is possible by employing a resistance 28 shown in Fig. 13.

In Fig. 12 the rectified voltage across the resistance 23, obtained by means of the rectifiers 39 and 40, counteracts the negative grid bias battery 13. The sum of the two voltages is applied through the resistances 26 and 27 to the grids of the tubes 1 and 2. In this case rectifiers are provided both in the grid and anode circuits.

In connection with the above, the rectifiers 3 and 4 of Fig. 13 substantially serve for the purpose of bringing about an intermittent operation, whereas the tubes 39 and 40 cause the average grid voltage of the tubes to increase under the influence of the excitation. If the condenser 31 of Fig. 13 is sufficiently reduced (or even omitted) the rectifiers 39 and 40 too, will strongly contribute to the intermittent operation of the tubes 1 and 2 (in consequence of the alternating voltage components occurring across the resistance 20). In this case it is even possible to omit the rectifiers 3 and 4 (and the chokes 41 and 42) so that the circuit arrangement shown in Fig. 14 is obtained.

Due to the fact that a compensation effect is also brought about by the transformer 11, it might be possible to give up the compensating voltages applied e. g. at $C_1$ and $C_2$. By means of $C_1$ and $C_2$, however, the amplifier may be so adjusted that the current delivered to the load impedance is practically independent of the value of said impedance.

Analogous to Fig. 14 is Fig. 15. Here rectification is also applied to the compensating voltages. The transformer used for this purpose is arranged in the primary circuit of the output transformer 10, in the same way as in Fig. 6, which is practically similar to Fig. 15. In Fig. 6 the increase of grid voltage caused by the excitation is effected by rectifying the control voltage itself, in Fig. 15 by rectifying part of the energy delivered by the amplifier. A similar connection exists between Figs. 12 and 13.

It is obvious that it does not make any difference whether the compensating transformer is arranged in the primary circuit of the output transformer (Figs. 6 and 15) or in its secondary circuit (Figs. 13 and 14).

Moreover it should be pointed out that in the case under consideration incomplete rectification may be used as well as in cases where the control voltage is rectified. This may be effected for instance by shunting the rectifiers with resistances.

Further either the control voltage or the compensating voltage may be rectified. The rectified voltage obtained may be applied in positive or negative direction, according to the sense in which the rectifiers operate. Both kinds of rectification may be made complete or incomplete (e. g. by superimposing an unrectified component, as in Fig. 16).

The voltage across the resistance 20 decreases the power taken by the tubes 1 and 2 and the losses in said tubes.

It is obvious that instead of being applied directly the rectified compensating voltages may also be applied indirectly through preceding amplifier stages (e. g. by introducing said voltages into the grid or anode circuits of preceding stages).

Further, before being rectified, the compensating voltages may be amplified. This may be of advantage to prevent certain retroactive effects.

The invention gives rise to a great number of combinations and circuit arrangements, the application of which depends upon circumstances.

In all circuit arrangements considered the phase and amplitude of the voltages applied to the grids must be such that the anode currents are never brought down to the region in which operation on considerably curved parts of the tube characteristics occurs.

In a further application of the invention it is also possible to adjust the tubes to operate on the upper end of the straight portion of the characteristic curve, preferably with zero grid voltage and low anode voltage. The rectifiers are then so arranged that only a decrease in grid voltage can occur.

It may easily be shown that with such adjustment the input power in inoperative condition, that is to say when there is no exciting voltage, is about the same as the input power when operating at the middle portion of the straight part of the characteristic curve and with high anode voltage. In spite of this the allowable maximum anode current variation is about twice as large, hence the developed power is four times as large. Since, however, each of the tubes deals only with half-cycles, the average output-energy is only about twice as large as when the tubes are adjusted to operate at the middle of the characteristic curve. The gain is, therefore, usually not so large as when operating at the lower part of the characteristic curve, because in the latter case the initial input-power, when the system is not controlled, may be considerably smaller and therefore the average efficiency correspondingly higher. Therefore the latter method is to be preferred and in view of this fact has been explained more in detail earlier in the specification.

When operating on the upper part of the characteristic curve it is of advantage for the average anode current to remain as constant as possible in spite of the exciting voltage. This is only possible by increasing the average anode voltage, which may be accomplished in the way already explained, the result being an increase in the average input energy.

In consideration of the fact that the other half waves of the control voltage are now operative, that is to say the negative half waves, which affect the direction in which the rectifiers have to pass current, the circuits already described can remain practically unchanged for adjustment for operation on the upper part of the characteristic curves.

Grid current rectification with the aid of grid resistances, as already described, may be applied here to the final amplifier tubes themselves when pentode-tubes are used, such tubes requiring no compensation. In general, in all circuits pentode tubes or similar tubes may be used for the final push-pull stage and in these cases the compensation may be omitted.

It has already been mentioned briefly, that losses due to interaction between the intermittently working push-pull tubes may also be reduced in a different way, that is to say by decreasing the internal resistance, or the effect of it, of each of the tubes, instead of increasing it. Except by special construction of the tubes, for instance by interchanging grid and anode of an ordinary triode, this is possible with the aid of compensation when triodes with a relatively high internal resistance are used.

When the method of compensation is employed the circuits may remain unchanged. It is only necessary to reverse the sense in which the compensating voltages are applied, so that the phase is shifted 180°.

As illustrated in the drawings, tubes with a high internal resistance, or the resistance of which is increased by means of compensation, are always used in combination with a common output transformer; the advantages of such a common output transformer in connection with push-pull arrangements being well known. However, it is also possible to use separate output transformers for the final push-pull tubes. In order to obtain the desired effect it is in this case necessary to connect the secondary windings in parallel, the load-impedance being connected to the common output terminals.

If, instead, the secondary windings of the separate output transformers are connected in series, the losses, due to the interaction, are reduced by making the internal resistances of the tubes very small, this being accomplished in the way already explained. This point will be made more clear by the following consideration:

The output transformer of tube 1 is practically short-circuited during the non-operative half-cycle of this tube due to small or artificially reduced internal resistance of this tube, so that the impedance measured at the secondary terminals is very small indeed. In this very small impedance there is, of course, practically no voltage-drop due to the output current delivered by the active tube 2 and flowing through the load impedance and through the secondary winding of the output transformer associated with tube 1. During the other half-cycle the action is the reverse. Thus the tubes are working intermittently without causing considerable energy-losses.

This method may be applied for instance to the circuit arrangements illustrated in Fig. 5 and Fig. 6 by providing each of the tubes 1 and 2 with a separate output transformer the secondary windings of which are connected in series, and further, by changing the sense in which the windings 15 and 16 act. When applied to Fig. 10 the resistances 32 and 33 have to be connected to the anodes of the tubes 1 and 2, while here again, of course, two output-transformers with their secondaries connected in series have to be used instead of one common transformer 10.

When this method is applied to push-pull arrangements with rectifiers in the anode circuits, for instance according to Figs. 11, 12 or 13, the rectifiers 3 and 4 may be placed in parallel with the primaries 8 and 9 of the separate output transformers and in this case the choke coils 41 and 42 may be omitted. An intermittent operation is then obtained because these rectifiers alternately provide a short-circuit path in consequence of their very low internal resistance.

The principal application of the invention lies in the field of power amplification at telephonic frequencies and the load-impedance may consist of an oscillator which has to be modulated or may consist of telephones or loudspeakers or other electro-acoustical devices of a similar nature etc. and these devices may be connected to the amplifier by long transmission lines or the like.

The invention may also be applied to intermediate amplifying stages when the load-impedance is constituted by the grid circuit of a following amplifier, particularly when a rather large amount of energy is required. The invention is, however, generally applicable to electrical amplifying circuits.

Although for the sake of clearness the foregoing explanations are restricted to the application of amplifier tubes arranged in push-pull connection, the principles mentioned are in no way restricted thereto. The invention is equally applicable to push-pull arrangements of oscillators, modulators, detectors or other devices or arrangements, in which the amount of energy conversion is controlled by a control action according to a characteristic curve having a substantially straight portion at which it is desired to operate and having curved ends, similar to the characteristic curve of an electron discharge device, operation at the curved portions having to be avoided for one reason or another.

Therefore, where in this description or in the claims the word tube is used for the sake of simplicity devices or arrangements as stated above are also meant.

It may be remarked here that it is well known that with push-pull arrangements it may be desirable to damp the transformer windings with resistances in order to suppress certain parasitic effects caused for instance by high frequency or transient oscillations.

It is of course quite possible to combine the amplifier tubes and rectifiers as well as other elements, for instance resistances and to enclose these in one glass vessel, thereby obtaining a more compact construction without departing from the spirit of the invention.

What I claim is:—

1. An electrical amplifying system comprising discharge tubes arranged in such a manner that 1. their control and output circuits are in balanced or push-pull relationship, means for biasing the control elements of the tubes to a value producing an adjustment of said tubes at the limit of the substantial linear parts of their control characteristics, rectification producing elements associated with the control circuits of the tubes and arranged to supply unsmoothed rectified energy to the control elements of said tubes in opposition to the bias applied thereto.

2. An electrical amplifying system comprising discharge tubes arranged in such a manner that their control and output circuits are in balanced or push-pull relationship, means for biasing the control elements of the tubes to a value producing an adjustment of said tubes at the limit of the substantial linear parts of their control characteristics, rectification producing elements associated with the control circuit of each of the tubes and arranged to supply unsmoothed rectified energy to the control elements of said tubes in opposition to the bias applied thereto.

3. An electrical amplifying system comprising discharge tubes arranged in such a manner that their control and output circuits are in balanced or push-pull relationship, means for biasing the control elements of the tubes to a value producing an adjustment of said tubes at the limit of the substantial linear parts of their control characteristics, rectification producing elements common to the control circuits of both tubes and arranged to supply unsmoothed rectified energy to the control elements of said tubes in opposition to the bias applied thereto.

4. An electrical amplifying system comprising discharge tubes arranged in such a manner that their control and output circuits are in balanced or push-pull relationship, means for biasing the control elements of the tubes to a value producing an adjustment of said tubes at the limit of the substantial linear parts of their control characteristics, amplifying means galvanically coupled to the control circuits of the tubes, rectification producing elements associated with said amplifying means and arranged to supply unsmoothed rectified energy to the input circuits of said amplifying means and from the output circuits of said amplifying means to the control elements of the tubes in opposition to the bias applied thereto.

5. An electrical amplifying system comprising discharge tubes arranged in such a manner that their control and output circuits are in balanced or push-pull relationship, means for biasing the control elements of the tubes to a value producing an adjustment of said tubes at the limit of the substantial linear parts of their control characteristics, rectification producing elements associated with the control circuits of the tubes, and connections arranged to supply to the control elements of said tubes, in opposition to the bias applied thereto, unsmoothed rectified energy derived by means of said rectification producing elements from the input terminals of the amplifying system.

6. An electrical amplifying system comprising discharge tubes arranged in such a manner that their control and output circuits are in balanced or push-pull relationship, means for biasing the control elements of the tubes to a value producing an adjustment of said tubes at the limit of the substantial linear parts of their control characteristics, rectification producing elements associated with the control circuits of the tubes, and connections arranged to supply to the control elements of the tubes, in opposition to the bias applied thereto, unsmoothed rectified energy derived by means of said rectification producing elements from the output circuits of the amplifying system.

7. An electrical amplifying system comprising discharge tubes arranged in such a manner that their control and output circuits are in balanced or push-pull relationship, means for biasing the control elements of the tubes to a value producing an adjustment of said tubes at the limit of the substantial linear parts of their control characteristics, rectification producing elements associated with the control element of the tubes and arranged to supply unsmoothed rectified energy to said elements in opposition to the bias applied thereto, and an additional rectification producing element in the output circuit of each tube.

JOHANNES JACQUES NUMANS.